3,259,633
3-PHENYL-2-INDOLECARBOXALDEHYDES AND PROCESS FOR THEIR PREPARATION
Werner Metlesics, Clifton, and Leo Henryk Sternbach, Upper Montclair, N.J., assignors to Hoffmann-La Roche Inc., Nutley, N.J., a corporation of New Jersey
No Drawing. Filed Oct. 31, 1963, Ser. No. 320,563
9 Claims. (Cl. 260—326.16)

The invention relates to novel compounds, novel intermediates therefor and processes for preparing same. More particularly, the invention relates to 3-phenyl-2-indolecarboxaldehydes, to a method for producing such compounds and to novel intermediates useful in making such indolecarboxaldehydes.

The novel compounds of the present invention are compounds of the formula

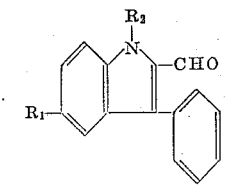

(I)

wherein $R_1$ is selected from the group consisting of hydrogen and halogen and $R_2$ is selected from the group consisting of hydrogen and lower alkyl.

The term "lower alkyl," as used above (and throughout the disclosure), comprehends both straight and branch chain hydrocarbon groups such as methyl, ethyl, N-propyl, isopropyl, butyl and the like. The term "halogen," as used above (and throughout the disclosure), is intended to encompass all the four forms thereof, i.e. chlorine, bromine, fluorine and iodine.

In a preferred aspect of the present invention, $R_1$ in Formula I above is either chlorine or hydrogen and $R_2$ is either hydrogen, methyl or ethyl.

The novel compounds of Formula I above can be prepared by several courses of procedure each utilizing, in its first stage, starting compounds having a 1,4-benzodiazepine structure. One of these routes uses 1,4-benzodiazepines of the formula

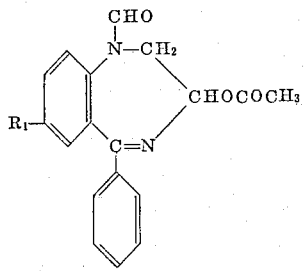

(II)

wherein $R_1$ is as above.

This reaction route involves hydrolyzing a 1,4-benzodiazepine of Formula II above with a base, preferably one dissolved in an aqueous medium, in the presence of any conveniently available inert organic solvent. Although it is preferred to hydrolyze under basic conditions, this reaction can be effected under acidic conditions, i.e. employing a mineral acid such as HCl rather than the base. The hydrolysis under either basic or acidic condition results in compounds corresponding to Formula I above. Among the organic solvents suitable for the preparation of compounds of Formula I above from compounds of Formula II above may be included a lower alkanol such as methanol, dioxane, tetrahydrofuran and the like. Bases suitable for the purposes of the present invention are represented by alkali metal hydroxides such as sodium hydroxide and potassium hydroxide and alkaline earth metal hydroxides such as calcium hydroxide and the like.

Another of the reaction routes leading to a compound of Formula I above utilizes 1,4-benzodiazepines of the formula

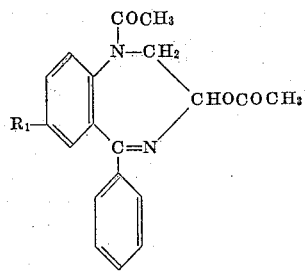

(III)

wherein $R_1$ is as above as a starting material.

This reaction route similarly involves treating a 1,4-benzodiazepine of Formula III above with a base in the presence of a conveniently available lower alkanol, advantageously disposed in an aqueous medium. Suitable lower alkanols are methanol, ethanol and the like. This basic hydrolysis of compounds of Formula III above produces 2-indolecarboxaldehyde di-lower alkyl acetals. The 2-indolecarboxaldehyde di-lower alkyl acetals so obtained which are of the formula

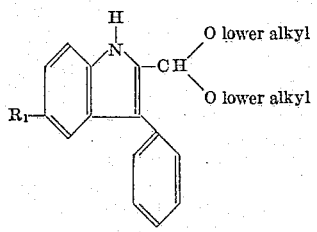

(IV)

wherein $R_1$ is as above can then be subjected to treatment with an acid agent, preferably one dissolved in an aqueous medium, in the presence of a solvent such as water, methanol, mixtures thereof and the like. Such acid hydrolysis of compounds of Formula IV above yields compounds of Formula I above wherein $R_2$ is hydrogen. Any conveniently available base may be employed in the first phase of the last-mentioned reaction, i.e. compound III→compound IV. Representative of such bases are alkali metal hydroxides such as sodium hydroxide and alkaline earth metal hydroxides. As acid agents suitable in the second phase of the last-mentioned reaction, i.e. the acid hydrolysis of compounds of Formula IV above, may be included mineral acids such as hydrochloric acid, calcium chloride and the like.

The preparation of compounds of Formula IV above from compounds of Formula III above, in the manner set out above, also yields compounds of Formula I above. The last-mentioned compounds can be separated from the reaction mass by any suitable means.

Compounds of Formula I can also be directly prepared from compounds of Formula III by hydrolyzing such compounds under acidic conditions. Such acid hydrolysis can be effected in the presence of any suitable acid agent such as a mineral acid, e.g. hydrochloric acid and the like in the presence of a solvent such as dioxane and a lower alkanol, e.g. methanol.

Compounds corresponding to Formula I above wherein $R_2$ is lower alkyl can be synthesized from compounds corresponding to Formula I above wherein $R_2$ is hydrogen by alkylating such compounds. The alkylation can be efficaciously effected by treating compounds corresponding to Formula I above wherein $R_2$ is hydrogen with a di-lower alkyl sulfate or a lower alkyl halide in the presence of a sodium alkylate such as sodium methoxide or sodium hydroxide or sodium hydride and any conveniently available inert solvent, for example, dimethylformamide, water, or a lower alkanol such as methanol, ethanol and the like. Suitable di-lower alkyl sulfates may be represented by dimethyl sulfate. Similarly, suitable lower alkyl halides may be represented by methyl iodide and the like.

Another method of preparing compounds of Formula I above wherein $R_2$ is lower alkyl involves hydrolyzing, under basic or acidic conditions, a compound of the formula

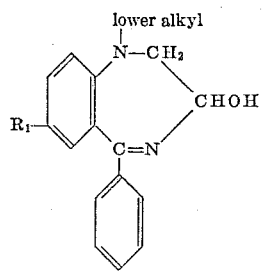

(V)

wherein $R_1$ is as above by any convenient hydrolysis technique such as by treatment of compounds of Formula V above with a base, e.g. an alkali metal hydroxide such as sodium hydroxide, or an acid agent such as a mineral acid, e.g. hydrochloric acid, in the presence of an organic solvent of the types set out hereinabove such as a lower alkanol, preferably, methanol or dioxane. Compounds of Formula I above wherein $R_2$ is lower alkyl can also be obtained in good yields by heating compounds of Formula V above, above the melting point thereof. Any temperature which is above the melting point of compounds of Formula V above, but below the temperature at which such compounds and the end product decomposes, is suitable to achieve the desired end. Temperatures of from about 130° C. to about 180° C., however, are preferred. Advantageously, methyl is present as the lower alkyl group.

Compounds corresponding to Formula I above can be oxidized to 3-phenyl-2-indolecarboxylic acids of the formula

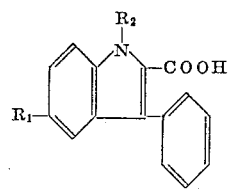

(VI)

wherein $R_1$ and $R_2$ are as above.

The oxidation of the compounds corresponding to Formula I above to 3-phenyl-2-indolecarboxylic acid of Formula VI above can be effected with any conventional oxidation system such as a mixture of silver nitrate and sodium hydroxide in the presence of a solvent such as ethanol, acetone or mixtures thereof.

Compounds of Formula I above wherein $R_1$ is hydrogen can be converted to the known 3-phenyl-2-indolecarboxylic acids. Compounds of Formula I above wherein $R_1$ is halogen can also be converted to the known 3-phenyl-2-indolecarboxylic acids. The last-mentioned conversion can be effected by treating compounds of Formula I above wherein $R_1$ is halogen, preferably chlorine, with a lower alkanol thereby forming the acetal thereof, subjecting the resultant acetal which has the Formula IV above wherein $R_1$ is halogen to dehalogenation and hydrolyzing conditions. The resultant compound which is a compound corresponding to Formula I above wherein $R_1$ is hydrogen can then be oxidized to the known 3-phenyl-2-indolecarboxylic acids as above.

The formation of compounds of Formula I above wherein $R_1$ is hydrogen from compounds corresponding to Formula IV above wherein $R_1$ is halogen, preferably chlorine, is achieved in any convenient manner such as hydrogenation with Raney nickel to effect removal of the halogen and subsequent hydrolysis of the dehalogenated acetal.

As is evident from the above, 3-phenyl-2-indolecarboxaldehydes can be converted to 3-phenyl-2-indolecarboxylic acid and homologues thereof and are useful as chemical intermediates [cf. W. Borsche et al., Ann. 548, 64 (1941), and R. Manske et al., J. Chem. Soc. 1, (1927)].

As is further evident from the above, the invention relates in one aspect to the preparation of compounds having the formula of

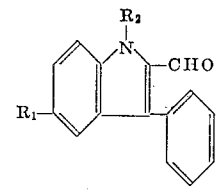

wherein $R_1$ is selected from the group consisting of hydrogen and halogen and $R_2$ is selected from the group consisting of hydrogen and lower alkyl by a method which comprises hydrolyzing a compound having the formula of

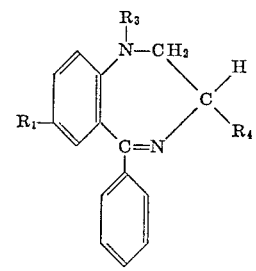

wherein $R_1$ is selected from the group consisting of hydrogen and halogen; $R_3$ is selected from the group consisting of lower alkyl and acyl such as a lower alkanoyl, e.g. acetyl, formyl or benzoyl and the like and $R_4$ is selected from the group consisting of hydroxy and acetoxy.

The foregoing is a general description of the main synthetic routes in the preparation of 3-phenyl-2-indolecarboxaldehyde. It will be readily apparent to one skilled in the art that variations of these procedures are possible.

The following examples are illustrative but not limitative of the compounds of this invention and the procedures for their preparation. All temperatures stated are in degrees centigrade.

*Example 1*

A solution of 0.35 g. of 3-acetoxy-7-chloro-2,3-dihydro-5-phenyl-1H-1,4-benzodiazepin-1-carboxaldehyde in 20 ml. of methanol and 10 ml. of 0.1 N aqueous sodium hydroxide was heated to 30–40° for 2 hours. A yellow precipitate melting at 235–240° formed which was isolated and found to be 5-chloro-3-phenyl-2-indolecarboxaldehyde.

The above-mentioned 3 - acetoxy - 7 - chloro - 2,3 - dihydro - 5 - phenyl - 1H - 1,4 - benzodiazepin - 1 - carboxaldehyde and the process of making same is not part of the present invention but such is disclosed hereinbelow in order that the disclosure be complete.

A solution of 5 g. of 7 - chloro - 2,3 - dihydro - 5 - phenyl - 1H - 1,4 - benzodiazepin - 1 - carboxaldehyde 4-oxide in 50 ml. of acetic anhydride was refluxed for 5 hours, then left at 25° for 17 hours. After evaporation of the acetic anhydride in vacuo, the residue crystallized on addition of ether to give 3-acetoxy-7-chloro-2,3-dihydro-5 - phenyl - 1H - 1,4 - benzodiazepin - 1 - carboxaldehyde as white prisms which after recrystallization from a mixture of dichloromethane and ether melted at 166–168°.

Example 2

A solution of 4.5 g. of 3-acetoxy-1-acetyl-7-chloro-2,3-dihydro - 5 - phenyl - 1H - 1,4 - benzodiazepine in 150 ml. of methanol and 50 ml. of 1 N aqueous sodium hydroxide was refluxed for 3 hours. The solution was concentrated in vacuo and extracted with dichloromethane. The dichloromethane was removed, and on addition of petroleum ether a precipitate formed which on recrystallization from a mixture of ether and petroleum ether gave 5 - chloro - 3 - phenyl - 2 - indolecarboxaldehyde as yellow needles melting at 231–237°. The mother liquor was evaporated to dryness and the residue recrystallized from a mixture of petroleum ether and ether yielding 5 - chloro - 3 - phenyl - 2 - indolecarboxaldehyde dimethylacetal as white prisms which melted at 134–137°.

The above-mentioned 3 - acetoxy - 1 - acetyl - 7 - chloro - 2,3 - dihydro - 5 - phenyl - 1H - 1,4 - benzodiazepine and the process of making same is not part of the present invention but such is disclosed hereinbelow in order that the disclosure be complete.

A solution of 7.0 g. of 1-acetyl-7-chloro-2,3-dihydro-5-phenyl-1H-1,4-benzodiazepine 4-oxide in 60 ml. of acetic anhydride was refluxed for 7 hours. After evaporation of the acetic anhydride in vacuo, the residue on addition of ether gave crystals which after recrystallization from a mixture of dichloromethane and hexane yielded 3 - acetoxy - 1 - acetyl - 7 - chloro - 2,3 - dihydro-5-phenyl-1H-1,4-benzodiazepine as white prisms melting at 177–179°.

Example 3

A solution of 0.5 g. of 5-chloro-3-phenyl-2-indolecarboxaldehyde dimethylacetal in 15 ml. of methanol and 15 ml. of 1 N hydrochloric acid was heated to reflux for 5 minutes. Yellow crystals of 5-chloro-3-phenyl-2-indolecarboxaldehyde precipitated which melted at 235–240°.

Example 4

A solution of 0.5 g. of 1-acetyl-7-chloro-2,3-dihydro-5 - phenyl - 1H - 1,4 - benzodiazepin - 3 - ol in 10 ml. of methanol, 1 ml. of water and 2 ml. of 1 N aqueous sodium hydroxide was refluxed for 2½ hours and evaporated. The dichloromethane extract of the residue was taken up in methanol and hydrochloric acid was added. A yellow precipitate which formed was collected on a filter and recrystallized from dichloromethane to give 5-chloro-3 - phenyl - 2 - indolecarboxaldehyde as yellow needles melting at 237–240°.

The above-mentioned 1 - acetyl - 7 - chloro - 2,3 - dihydro - 5 - phenyl - 1H - 1,4 - benzodiazepin - 3 - ol and the process of making same is not part of the present invention but such is disclosed hereinbelow in order that the disclosure be complete.

To a solution of 1.78 g. of 3 - acetoxy - 1 - acetyl - 7-chloro - 2,3 - dihydro - 5 - phenyl - 1H - 1,4 - benzodiazepine in 50 ml. of methanol was added 10 ml. of 1 N aqueous sodium hydroxide dropwise over a period of 10 minutes. The solution was concentrated in vacuo without heating and extracted with dichloromethane. On concentration of the dichloromethane and addition of ether 1 - acetyl - 7 - chloro - 2,3 - dihydro - 5 - phenyl-1H-1,4-benzodiazepin-3-ol was obtained which melted at 170–171°.

Example 5

To a solution of 0.5 g. of 5-chloro-3-phenyl-2-indolecarboxaldehyde in 10 ml. of dimethylformamide was added 0.2 g. of a 50 percent suspension of sodium hydride in mineral oil. The mixture was kept for 15 minutes at 36–40°, cooled to 25° and 0.28 ml. of methyliodide was added. After 15 minutes the solution was poured into water and filtered from the precipitate which was recrystallized from a mixture of methylene chloride and petroleum ether to give 5 - chloro - 1 - methyl - 3 - phenyl-2-indolecarboxaldehyde as yellow needles melting at 156–159°.

Example 6

A solution of 0.5 g. of 7-chloro-2,3-dihydro-1-methyl-5 - phenyl - 1H - 1,4 - benzodiazepin - 3 - ol in 20 ml. of methanol and 10 ml. of 0.1 N aqueous sodium hydroxide was heated to 30–40° for 2 hours. A precipitate formed which was isolated. The precipitate was recrystallized from a mixture of methylene chloride and petroleum ether to give 5 - chloro - 1 - methyl - 3 - phenyl - 2 - indolecarboxaldehyde as yellow needles melting at 156–159°.

Example 7

0.5 g. of 7 - chloro - 2,3 - dihydro - 1 - methyl - 5-phenyl-1H-1,4-benzodiazepin-3-ol was heated above its melting point in a bulb tube (0.1 mm., bath temp, ca. 160°). The resultant product was collected, cooled and recrystallized from a mixture of methylene chloride and petroleum ether to give 5-chloro-1-methyl-3-phenyl-2-indolecarboxaldehyde as yellow needles melting at 156–159°.

The above-mentioned 7 - chloro - 2,3 - dihydro - 1-methyl - 5 - phenyl - 1H - 1,4 - benzodiazepin - 3 - ol and the process of making same is not part of the present invention but such is disclosed hereinbelow in order that the disclosure be complete.

A solution of 5.4 g. of 7-chloro-2,3-dihydro-5-phenyl-1H-1,4-benzodiazepin 4-oxide in 100 ml. of dimethylformamide was prepared under dry nitrogen. To this solution 3.18 g. of a 50 percent suspension of sodium hydride in mineral oil was added with stirring, and the bath temperature was raised to about 50°. After one hour the mixture was cooled in an ice bath and 6 ml. of methyliodide was added thereto. The solution was kept at 25° for 18 hours, and then poured into ice water. After extraction with dichloromethane, an oil was obtained which crystallized on addition of a mixture of ether and petroleum ether to give crystals of 7-chloro-2,3 - dihydro - 1 - methyl - 5 - phenyl - 1H - 1,4 - benzodiazepin 4-oxide which upon recrystallization from a mixture of dichloromethane and petroleum ether yielded yellow prisms melting at 139–142°.

A solution of 3.1 g. of 7-chloro-2,3-dihydro-1-methyl-5-phenyl-1H-1,4-benzodiazepin 4-oxide in 20 ml. of acetic anhydride was refluxed for 70 minutes. The brown solution was concentrated in vacuo, the residue was dissolved in benzene and placed on a column containing 90 g. aluminum oxide (Woelm neutral, activity grade 2). Elution with ethyl acetate gave crystals which after recrystallization from a mixture of methylene chloride and petroleum ether yielded light yellow prisms of 7-chloro-2,3-dihydro - 1 - methyl - 5-phenyl-1H-1,4-benzodiazepin-3-ol melting at 155–156°.

Example 8

A solution containing 2.4 g. of 5-chloro-3-phenyl-2-indolecarboxaldehyde dimethylacetal and 8 ml. of 1 N sodium hydroxide in 100 ml. of ethanol was hydrogenated at atmospheric pressure and 25° using ca. 5 g. of Raney nickel as catalyst. The uptake stopped after the consumption of 170 ml. of hydrogen. The solution was filtered from the catalyst and evaporated in vacuo. The residue was shaken with dilute hydrochloric acid and extracted with ether. The ether solution on evaporation gave a crystalline residue which after recrystallization from a mixture of dichloromethane and methanol gave 3-phenyl-2-indolecarboxaldehyde as pale yellow needles melting at 195–197°.

Example 9

To a solution of 0.11 g. of 3-phenyl-2-indolecarboxaldehyde in a mixture of 30 ml. of ethanol and 20 ml. of acetone was added 0.17 g. of silver nitrate and 15 ml. of 0.1 N aqueous sodium hydroxide. The solution was stirred at 25° for 17 hours, filtered and the filtrate was concentrated in vacuo. The residue was dissolved in diluted sodium hydroxide and the solution was extracted with ether. On acidification of the aqueous layer, a precipitate formed which was collected on a filter, dried and recrystallized from a mixture of ether and petroleum ether. White prisms of 3-phenyl-2-indolecarboxylic acid melting at 188–190° were obtained.

*Example 10*

A solution of 0.5 g. of 5-chloro-3-phenyl-2-indolecarboxaldehyde in 50 ml. of methanol containing a few crystals of p-toluene sulfonic acid monohydrate was refluxed for 16 hours. After addition of 30 ml. of benzene, the solution was concentrated to one-half of the original volume, made basic with sodium methoxide and concentrated further. On addition of water, a precipitate was obtained which was separated. The mother liquor was evaporated to dryness. The residue as recrystallized from a mixture of ether and petroleum ether yielding 5-chloro-3-phenyl-2-indolecarboxaldehyde dimethylacetal which melted at 134–137°.

We claim:
1. A compound of the formula

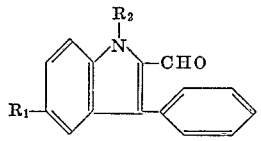

wherein $R_1$ is selected from the group consisting of halogen; and $R_2$ is selected from the group consisting of hydrogen and lower alkyl.

2. 5-chloro-3-phenyl-2-indolecarboxaldehyde.

3. A compound of the formula

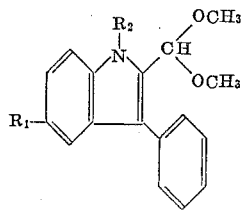

wherein $R_1$ is selected from the group consisting of hydrogen and halogen, and $R_2$ is selected from the group consisting of hydrogen and lower alkyl.

4. 5-chloro-3-phenyl-2-indolecarboxaldehyde dimethylacetal.

5. A process for the preparation of a compound of the formula

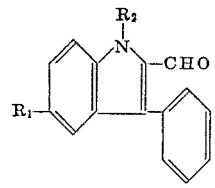

wherein $R_1$ is selected from the group consisting of hydrogen and halogen, and $R_2$ is selected from the group consisting of hydrogen and lower alkyl which comprises hydrolyzing a compound having the formula of

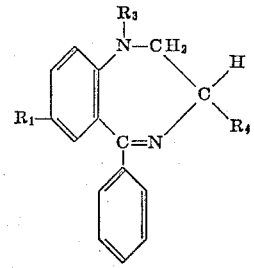

wherein $R_1$ is selected from the group consisting of hydrogen and halogen; $R_3$ is selected from the group consisting of lower alkyl and lower alkanoyl and $R_4$ is selected from the group consisting of hydroxy and acetoxy.

6. A process which comprises hydrolyzing a compound having the formula of

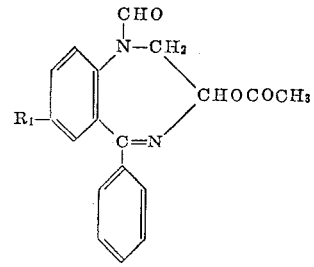

wherein $R_1$ is selected from the group consisting of halogen and hydrogen.

7. A process which comprises hydrolyzing, under basic conditions, in the presence of a lower alkanol a compound of the formula

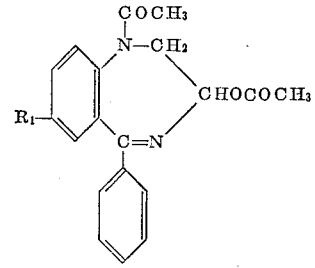

wherein $R_1$ is selected from the group consisting of hydrogen and halogen
to thereby form a compound having the formula of

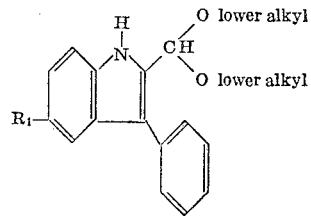

wherein $R_1$ is as above.

8. A process which comprises hydrolyzing, under basic conditions, in the presence of a lower alkanol a compound of the formula

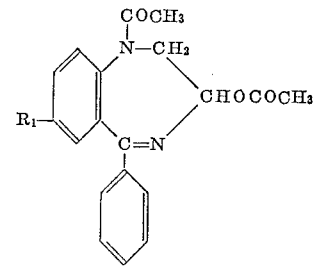

(I)

wherein $R_1$ is selected from the group consisting of hydrogen and halogen
to thereby form a compound having the formula of

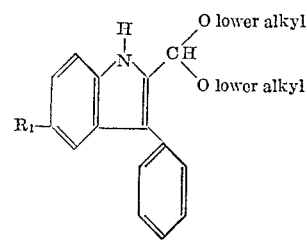

(II)

wherein $R_1$ is as above
and hydrolyzing the so-formed compound of formula II above under acid conditions to thereby form a compound having the formula of

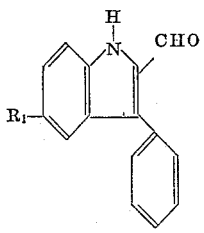

(III)

wherein $R_1$ is as above.

9. A process for the preparation of a compound having the formula of

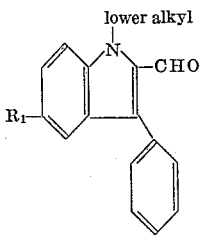

wherein $R_1$ is selected from the group consisting of hydrogen and halogen which comprises hydrolyzing a compound of the formula

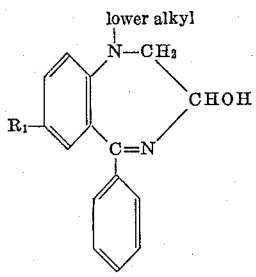

wherein $R_1$ is as above.

References Cited by the Examiner

UNITED STATES PATENTS 3,012,040   12/1961   Lind et al. _____ 260—319

OTHER REFERENCES

Taylor, Helv. Chim. Acta, volume 33, No. 24, 1950, pages 164–169, Call No. QD1–A4.

Synder et al., Jour. Amer. Chem. Soc., volume 74, 1952, pages 5110–5113, Call No. QD1–A5.

HENRY R. JILES, *Acting Primary Examiner.*

NICHOLAS RIZZO, *Examiner.*

M. O'BRIEN, *Assistant Examiner.*